United States Patent [19]

Müller et al.

[11] Patent Number: 4,840,109

[45] Date of Patent: Jun. 20, 1989

[54] APPARATUS FOR DELIVERING AMMUNITION FROM A CONTAINER STRUCTURE TO A FIRING WEAPON

[75] Inventors: Kurt Müller, Zürich; Erwin Bohler, Dübendorf, both of Switzerland

[73] Assignee: Werkzeugmaschinenfabrik Oerlikon-Bührle AG, Zürich, Switzerland

[21] Appl. No.: 147,876

[22] Filed: Jan. 25, 1988

[30] Foreign Application Priority Data

Feb. 2, 1987 [CH] Switzerland ............................ 362/87

[51] Int. Cl.$^4$ .............................................. F41D 10/22
[52] U.S. Cl. ........................................ 89/33.14; 89/34; 89/126
[58] Field of Search ............... 89/1.41, 11, 33.04, 89/33.1, 33.14, 33.16, 33.2, 34, 46, 126

[56] References Cited

U.S. PATENT DOCUMENTS

| | | | |
|---|---|---|---|
| 2,300,602 | 11/1942 | Trotter et al. | 89/33.16 |
| 2,331,033 | 10/1943 | La Porte | 89/33.14 |
| 2,870,681 | 1/1959 | Linke | 89/34 |
| 4,412,611 | 11/1983 | Golden | 89/34 |
| 4,503,750 | 3/1985 | Ignacek | 89/34 |

FOREIGN PATENT DOCUMENTS

| | | |
|---|---|---|
| 0078482 | 5/1983 | European Pat. Off. . |
| 3200726 | 12/1982 | Fed. Rep. of Germany . |
| 55900 | 9/1952 | France . |
| 1052733 | 1/1954 | France . |

Primary Examiner—Stephen C. Bentley
Attorney, Agent, or Firm—Werner W. Kleeman

[57] ABSTRACT

In the case of a twin-barrelled firing weapon, the apparatus for delivering ammunition from a container structure to the firing weapon is located between the two weapon barrels of the firing weapon. In order to accommodate or store as much ammunition as possible in the space between the two weapon barrels, the cartridges are arranged not only side by side but also one behind the other. There is provided as the container structure a first front container from which cartridges are delivered to one weapon barrel and a second rear container from which cartridges are delivered to the other weapon barrel. The cartridges from one of the two containers are delivered to the related weapon barrel by a device for axially displacing the cartridges.

4 Claims, 4 Drawing Sheets

APPARATUS FOR DELIVERING AMMUNITION FROM A CONTAINER STRUCTURE TO A FIRING WEAPON

BACKGROUND OF THE INVENTION

The present invention relates to a new and improved apparatus for delivering ammunition from a container structure to a firing weapon.

In its more particular aspects, the present invention relates to a new and improved apparatus for delivering ammunition from an ammunition container structure to a firing weapon, wherein the cartridges in the ammunition container structure are arranged side by side as well as one behind the other and are located in endless storage chains.

In a known ammunition magazine of this type as described in German Patent No. 3,200,726, published Dec. 2, 1982, a multiplicity of cartridge rows are stored within a housing without there being required partition walls between the cartridge rows. The ammunition magazine comprises a cover or top plate and a floor or base plate which are separated from each other by a predetermined number of walls disposed perpendicular thereto, thus forming between the top plate and the floor plate a predetermined number of ammunition storage sections or stores and guide channels. An endless link chain is provided in these ammunition storage sections and guide channels and serves to deliver the ammunition stored within these storage sections and guide channels to a discharge opening of the magazine. This link chain is structured to hold at least two rows of cartridges mounted one behind the other between the top plate and the floor plate, whereby the lengthwise axis of each cartridge extends substantially perpendicular to the top plate and the floor plate.

This known ammunition magazine can store a relatively large number of cartridges within a relatively small space. However, with the aforementioned link chain, the cartridges can be supplied to only one single discharge or extraction opening of the container. Such a container is thus not capable of being used with a twin-barrel firing weapon because it is not possible to deliver cartridges from this container simultaneously to both weapon barrels.

SUMMARY OF THE INVENTION

Therefore with the foregoing in mind it is a primary object of the present invention to provide a new and improved apparatus for delivering ammunition from a container structure to a firing weapon which does not exhibit the aforementioned drawbacks and shortcomings of the prior art ammunition containers.

It is a further important object of the present invention to provide a new and improved apparatus for delivering ammunition from a container structure to a firing weapon which is structured to store as much ammunition as possible between the two weapon barrels of a twin-barrel weapon.

Now to implement these and still further objects of the invention which will become more readily apparent as the description proceeds, the apparatus of the present development is manifested by the features that the ammunition container structure mounted between two weapon barrels of the firing weapon comprises two mutually offset ammunition containers or magazines. These two mutually offset ammunition containers or magazines define a first front container and a second rear container when viewed in the direction of firing of the two weapon barrels. The first front container comprises a first endless storage chain, a device for axially displacing cartridges and a first endless conveyor chain for delivering ammunition from the first front container via the device for axially displacing cartridges to the related one of the two weapon barrels. The second rear container comprises a second endless storage chain and a second endless conveyor chain for delivering ammunition from the second rear container directly to the other one of the two weapon barrels.

BRIEF DESCRIPTION OF THE DRAWINGS

The invention will be better understood and objects other than those set forth above will become apparent when consideration is given to the following detailed description thereof. Such description makes reference to the annexed drawings wherein throughout the various figures of the drawings, there have been generally used the same reference characters to denote the same or analogous components and wherein.

DETAILED DESCRIPTION OF THE PREFERRED EMBODIMENT

Figure 1:
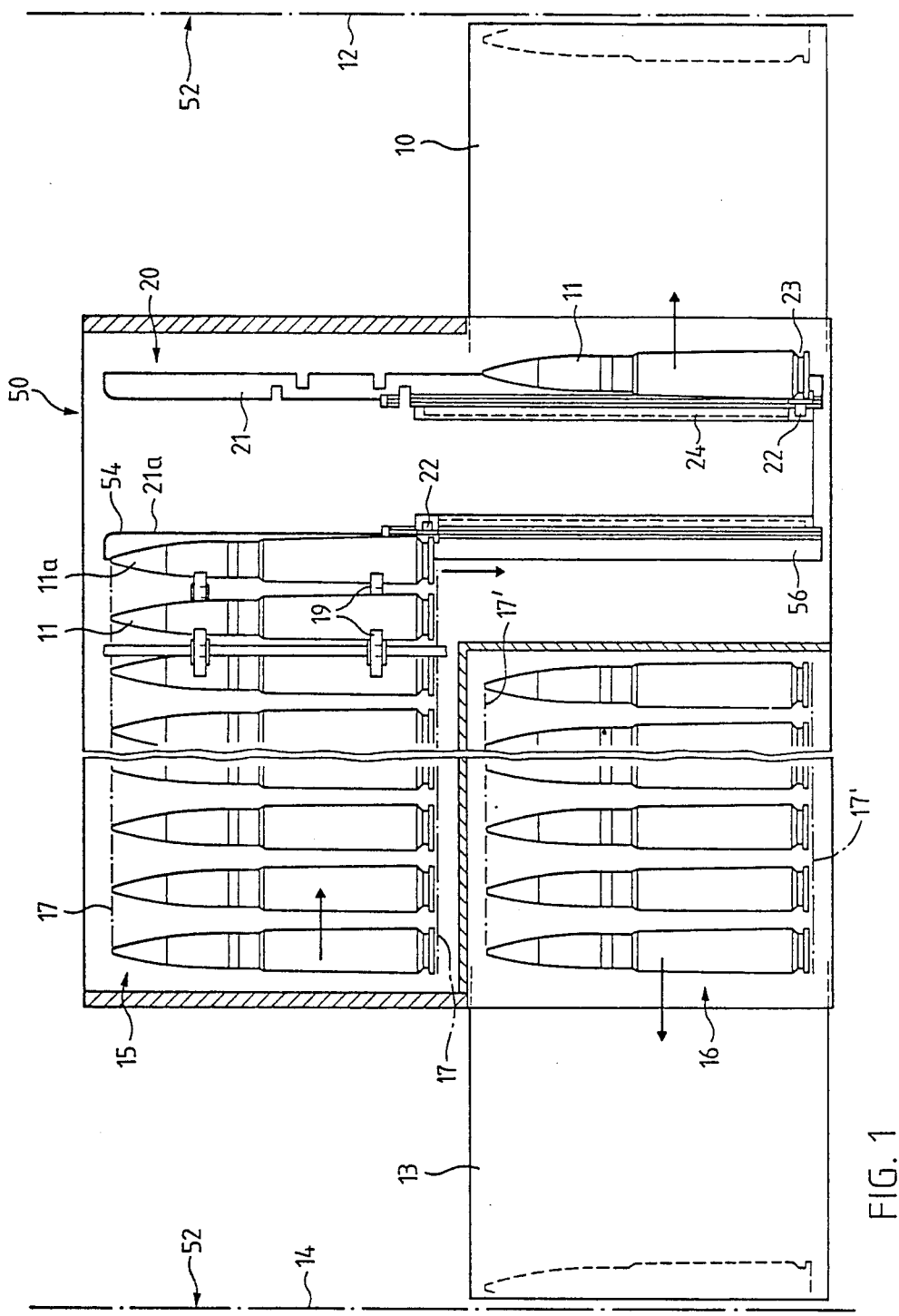
FIG. 1 is a top plan view of the inventive apparatus comprising an ammunition container structure mounted between two weapon barrels of a firing weapon and which weapon barrels are arranged in mutually spaced relationship adjacent one another.

Describing now the drawings, it is to be understood that only enough of the structure of the ammunition delivering or feeding apparatus has been shown therein as needed for those skilled in the art to readily understand the underlying principles and concepts of the present development, while thus simpifying the showing of the drawings. Turning attention now specifically to FIG. 1, there has been illustrated an ammunition container structure 50 which is arranged or mounted between two weapon barrels 12 and 14 of a firing weapon generally indicated by reference numeral 52 and which weapon barrels are only schematically depicted in the drawings and arranged along side one another.

Figure 2:
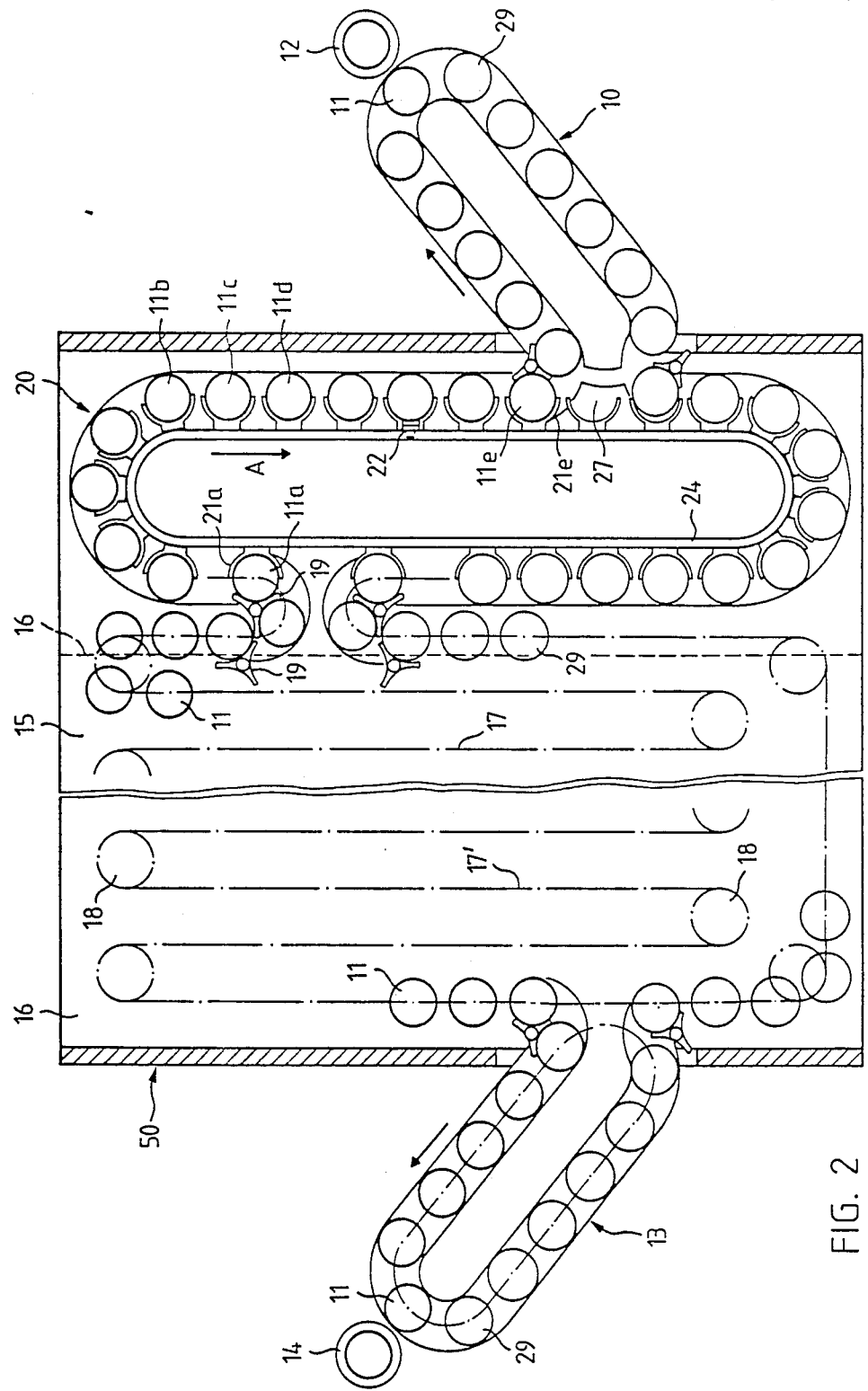
FIG. 2 is an elevation view, partially in section, of the ammunition container structure shown in FIG. 1.

As shown in FIGS. 1 and 2, a first endless conveyor chain 10 conveys ammunition or cartridges 11 to a first weapon barrel 12 of which only the weapon barrel axis is visible in FIG. 1. A second endless conveyor chain 13 conveys ammunition or cartridges 11 to a second weapon barrel 14 of which again only the weapon barrel axis is visible in the showing of FIG. 1. The cartridges 11 for the first weapon barrel 12 are delivered from a first ammunition container 15 of the container structure 50, while the cartridges 11 for the second weapon barrel 14 are delivered from a second ammunition container 16 of such container structure 50. Viewed in the direction of firing of the firing weapon 52, the first ammunition container 15 is located in a predetermined position relative to the second ammunition container 16, here shown in front of the second ammunition container 16.

The cartridges 11 from the first front ammunition container 15 must first be displaced in axial direction to the rear before they can be delivered by means of the first endless conveyor chain 10 to the first weapon barrel 12. The cartridges 11 from the second rear ammunition container 16 can be directly delivered from an endless storage chain 17' without axial displacement and by means of the second endless conveyor chain 13 to the second weapon barrel 14.

The first front ammunition container 15 is provided with an endless storage chain 17 which is guided by means of a plurality of deflection wheels 18 as shown in FIG. 2. The cartridges 11 to be stored in the first front ammunition container 15 are located in this endless storage chain 17. The cartridges 11 in the endless storage chain 17 are transferred from this endless storage chain 17 to an endless extraction or removal chain 20 by means of star wheels 19 or equivalent structure. This extraction chain 20 defines an endless cartridge carrier by means of which the cartridges 11 are supplied from the first front ammunition container 15 to the first endless conveyor chain 10. This endless extraction chain 20 comprises a plurality of buckets or cradles 21 which are substantially longer, for instance at least twice the length of a single cartridge 11.

Figure 3:
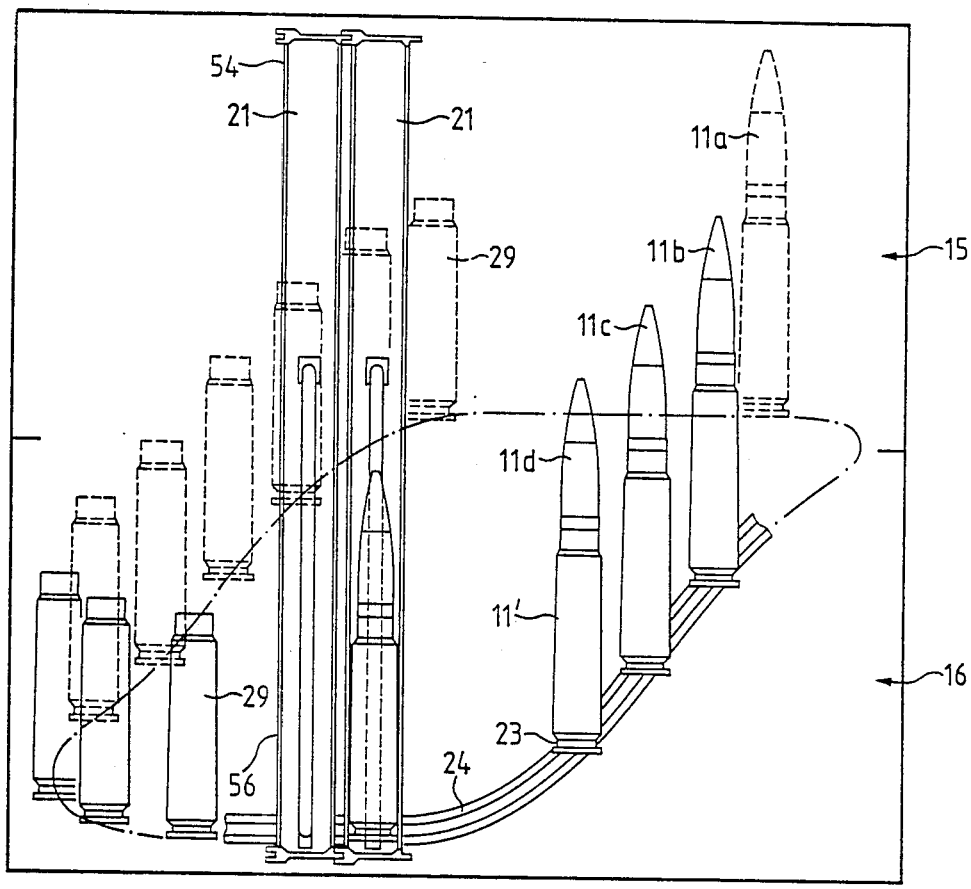
FIG. 3 is a schematic view showing details of the device for axially displacing the cartridges within the container structure during delivering ammunition from the container structure to the firing weapon.

As shown in FIGS. 1 to 3, the cartridges 11 or the like stored in the first front ammunition container 15 are delivered therefrom into the one or upper end 54 of each of the buckets 21 (see FIG. 3). Subsequently, the cartridges 11 are axially displaced within the buckets 21. At the other or lower end 56 of the buckets 21, the cartridges 11 are extracted from these buckets 21 and transferred to the first endless conveyor chain 10 which, as previously described, delivers the cartridges 11 to the first weapon barrel 12. Stated in another way and as illustrated in detail in FIGS. 1 to 3, the cartridge 11a is delivered to the associated bucket or cradle located at position 21a in FIG. 2 and this cartridge is then extracted from the bucket as indicated for the cartridge at position 11e and located in the bucket now positioned at location 21e. This is so because the endless extraction chain 20 moves in the direction of the arrow A shown in FIG. 2 and the cartridge 11a located in the bucket 21a is accordingly displaced from its infeed position to its outfeed position so that the cartridge 11a and bucket 21a assume the position of the cartridge 11e and bucket 21e shown in FIG. 2. During this operation, each of the cartridges 11 in the associated bucket 21 is displaced in axial direction from the one or upper end 54 of the bucket 21 to the other or lower end 56 thereof (FIG. 3).

Figure 4:
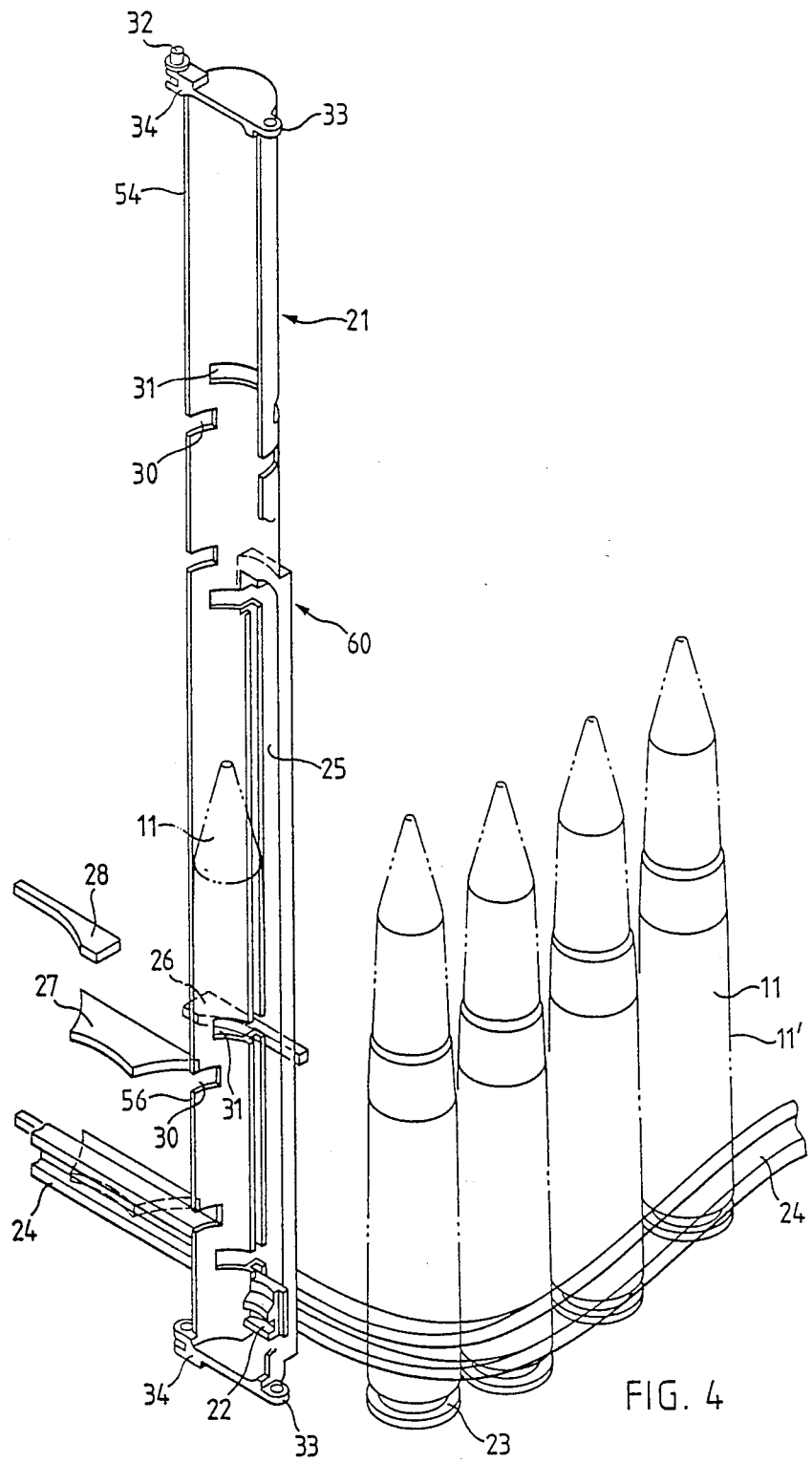
FIG. 4 is a schematic and perspective view of the device depicted in FIG. 3.

The device or structure 60 to axially displace a cartridge 11 in the associated bucket or cradle 21 is particularly evident from the showing of FIG. 4. This device 60 comprises a guide block or shoe 22 which engages, on the one hand, with an extractor or extraction groove 23 provided in the casing or case 11' of the cartridge 11 and, on the other hand, with an endless guide rail 24 or the like fixedly arranged at the first front ammunition container 15. Furthermore, this guide block or shoe 22 is also displaceably guided in a groove or raceway 25 of the related bucket or cradle 21 and is appropriately secured against falling out of this groove or raceway 25. When the endless extraction chain 20 moves in the direction of the arrow A of FIG. 2, the guide block or shoe 22 glides or slides along the endless guide rail 24 and moves along the groove or raceway 25 of the bucket 21, thus displacing with it the cartridge 11 from the one end 54 of the bucket 21 to the other end 56 thereof.

As shown in FIG. 4 various fixedly arranged extractor cams 26, 27 and 28 serve, on the one hand, to comb out the cartridges 11 from the endless extraction chain 20 and such serve, on the one hand, to transfer the cartridges 11 to the first endless conveyor chain 10 and, on the other hand, to return the empty cartridge cases 29, as shown in FIGS. 2 and 3, from the first endless conveyor chain 10 to the endless extraction chain 20. The extractor cams 26, 27 and 28 engage with related appropriately configured slots or recesses 30 and 31 provided in the buckets or cradles 21. The endless extraction chain 20, which consists of the buckets or cradles 21, differs from a known bucket chain inasmuch as each bucket or cradle 21 is about twice as long as is usually the case and is structured such that an axial displacement of the cartridges 11 within the buckets or cradles 21 is possible. As shown in FIGS. 3 and 4, each bucket 21 is provided at both ends with a bracket 34 or equivalent structure and a locking eyelet 33 so that the buckets 21 can be appropriately fastened together by means of a chain bolt or link pin 32 inserted into the locking eyelets 33 of one bucket 21 and into the bracket 34 of the adjacent bucket 21.

Figure 5:
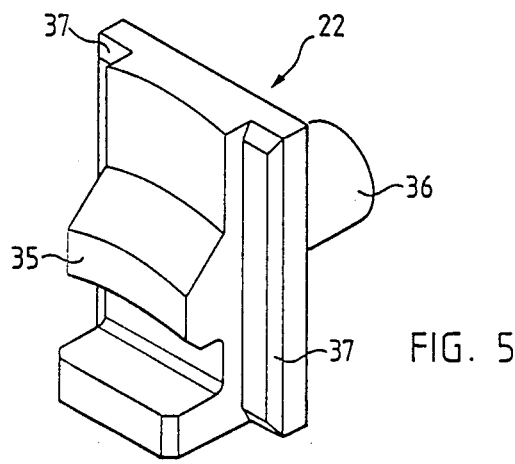
FIG. 5 is an enlarged perspective view of a guide shoe or block of the device depicted in FIG. 4.

As shown in greater detail in FIG. 5, the sliding guide block or shoe 22 is provided with a cam or dog or lug 35 which projects into the extractor groove 23 of the casing or case 11' of the related cartridge 11 and, furthermore, with a protuberance in the form of a bolt or pin 36 which projects into the endless guide rail 24. Two ribs or rib members 37 serve to guide the guide block or shoe 22 along the longitudinal groove 25 of the associated bucket or cradle 21.

The mode of operation of the apparatus for delivering ammunition from the container structure to the firing weapon as described hereinbefore is as follows:

In order to load the two containers or ammunition magazines 15 and 16 of the container structure 50, the endless conveyor chains 10 and 13, the endless storage chains 17 and 17' and the endless extraction chain 20 located in the container 15, are appropriately driven in conventional manner. Cartridges 11 are delivered to the endless conveyor chains 10 and 13 at the region of the weapon barrels 12 and 14, respectively. The cartridges 11 supplied to the first endless conveyor chain 10 are transferred via the endless extraction chain 20 into the endless storage chain 17 of the first front ammunition container or magazine 15. The cartridges 11 supplied to the second endless conveyor chain 13 are delivered directly to the endless storage chain 17' of the second rear container or magazine 16.

When the firing weapon 52 is operated by placement into its firing mode, the cartridges 11 located in the first front ammunition container or magazine 15 are delivered by the endless storage chain 17 to the endless extraction chain 20. This endless extraction chain 20 conveys the cartridges 11 to the first endless conveyor chain 10. During this operation, the cartridges 11 within the buckets or cradles 21 are axially displaced to the rear in the manner previously described. Furthermore, when the firing weapon 52 is thusly operated, the cartridges 11 located in the second rear ammunition container or magazine 16 are directly delivered by the endless storage chain 17' to the second endless conveyor chain 13. The endless conveyor chains 10 and 13 deliver the cartridges 11 to their related weapon barrels 12 and 14, respectively.

While there are shown and described present preferred embodiments of the invention, it is to be distinctly understood that the invention is not limited thereto, but may be otherwise variously embodied and practiced within the scope of the following claims. Accordingly,

What we claim is:

1. An apparatus for delivering ammunition from a container structure to a firing weapon having two spaced weapon barrels, wherein the cartridges in the container structure are arranged side by side as well as one behind the other, comprising:

an ammunition container structure mounted between the two spaced weapon barrels of the firing weapon;

said ammunition container structure comprising a first front ammunition container and a second rear ammunition container viewed in the direction of firing of the two spaced weapon barrels;

said first front ammunition container being operatively associated with one of said two spaced weapon barrels;

said second rear ammunition container being operatively associated with the other one of said two spaced weapon barrels;

a first endless storage chain arranged in said first front ammunition container;

a second endless storage chain arranged in said second rear ammunition container;

said first front ammunition container comprising:

a device for axially displacing cartridges within said first front ammunition container;

a first endless conveyor chain; and ammunition from said first front ammunition container being delivered by said device for axially displacing cartridges and by said first endless conveyor chain to the associated one of said two spaced weapon barrels;

said second rear ammunition container comprising:

a second endless conveyor chain; and ammunition from said second rear ammunition container being delivered by said second endless conveyor chain directly to the other associated one of said spaced two weapon barrels.

2. The apparatus as defined in claim 1, wherein:

said device for axially displacing cartridges comprises:

an endless movable extraction chain;

a plurality of buckets provided for said endless movable extraction chain;

each one of said plurality of buckets having a length which is greater than the length of each of said cartridges;

each one of said plurality of buckets being provided with a longitudinal groove;

an endless guide rail;

a guide block displaceably guided in said longitudinal groove of each bucket;

each of said cartridges having a cartridge case containing an extractor groove; and said guide block comprising means for engaging with said extractor groove of a cartridge located in the bucket thereof and means for engaging with said endless guide rail such that during movement of said endless movable extraction chain said guide block is displaced along said longitudinal groove in axial direction together with the engaged cartridge.

3. The apparatus as defined in claim 2, wherein:

each one of said plurality of buckets which has a length greater than each of said cartridges has a length which is at least twice as long as the length of each of said cartridges.

4. An apparatus for delivering ammunition from a container structure to a firing weapon having two spaced weapon barrels, comprising:

ammunition container means mounted between the two spaced weapon barrels of the firing weapon;

said ammunition container means comprising a first ammunition magazine and a second ammunition magazine arranged in offset relationship as viewed in a predeterminate direction of firing of the two spaced weapon barrels;

said first ammunition magazine being operatively associated with one of said two spaced weapon barrels;

said second ammunition magazine being operatively associated with the other one of said two spaced weapon barrels;

a first movable endless cartridge storage means arranged in said first ammunition magazine;

a second movable endless cartridge storage means arranged in said second ammunition magazine;

said first ammunition magazine comprising:

a device for axially displacing cartridges within said first ammunition magazine;

a first endless movable cartridge conveyor means for conveying cartridges; and ammunition from said first ammunition magazine being delivered by said device for axially displacing cartridges and by said first endless movable conveyor means to the associated one of said two spaced weapon barrels;

said second ammunition magazine comprising:

a second endless movable cartridge conveyor means; and ammunition from said second ammunition magazine being delivered by said second endless movable conveyor means directly to the other associated one of said two spaced weapon barrels.

* * * * *